Figure 1:
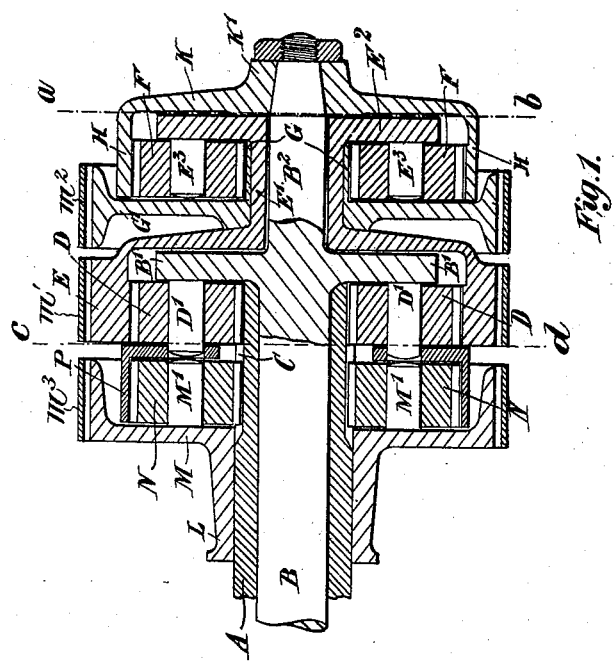

No. 664,653.  
F. W. LANCHESTER.  
GEAR FOR TRANSMITTING POWER.  
(Application filed June 30, 1900.)  
Patented Dec. 25, 1900.

(No Model.)  
2 Sheets—Sheet 1.

WITNESSES:

INVENTOR  
Frederick William Lanchester  
BY  
ATTORNEYS.

UNITED STATES PATENT OFFICE.

FREDERICK WILLIAM LANCHESTER, OF BIRMINGHAM, ENGLAND.

GEAR FOR TRANSMITTING POWER.

SPECIFICATION forming part of Letters Patent No. 664,653, dated December 25, 1900.

Application filed June 30, 1900. Serial No. 22,115. (No model.)

*To all whom it may concern:*

Be it known that I, FREDERICK WILLIAM LANCHESTER, a subject of the Queen of Great Britain and Ireland, and a resident of 53 Hagley road, Edgbaston, in the city of Birmingham, England, have invented a certain new and useful Improvement in Gear for the Transmission of Power, (for which I have made application for Letters Patent in Great Britain, No. 4,806, dated March 13, 1900,) of which the following is a specification.

This invention relates to improvements in change-speed mechanism more especially applicable to motor-vehicles, and refers more particularly to improvements in the arrangement and disposition of change-gears of the epicyclic type, whereby greater compactness and efficiency may be obtained.

In one arrangement in which epicyclic gearing is employed for giving a change of gearing ratio (or "change-speed," as it is customarily called) the internal element is driven from the motor-shaft, and the intermediate or planet element is connected to the driving-axle of the vehicle. The disadvantage of this arrangement as heretofore constructed is that unless bevel-wheels are employed for the intermediate element the ratio of the change of gearing obtainable is limited and does not always fit in with the requirements of the designer. This difficulty may be met by designing with bevel-gears or by fitting double planet-wheels having different diameters to gear with the internal and external elements. Neither of these methods is entirely satisfactory, however, owing to the additional space occupied and other difficulties of design. The simple arrangement of epicyclic gear is quite well suited to a drop of about three to one in the ratio or for anything greater than this; but for less ratios the diameter of the planet-pinions becomes so small as to render construction difficult. By reversing the arrangement and driving the outer element from the motor and constituting the inner element a brake-drum a more suitable ratio for many purposes is obtainable; but the high velocity given to the various pinions is objectionable. Another difficulty the present invention is intended to obviate is the difficulty of arranging a number of alternative epicyclic gears of different proportions. It often occurs in designing these gears that the arrangement required is impossible of construction.

My invention consists in providing an epicyclic gear of suitable ratio and in compounding with it one or more sets of epicyclic gear-trains, the outer element of the first and of each succeeding train being capable of receiving motion from the intermediate element of its adjacent train, thereby enabling the first to be rendered operative alone or through one or more of its compounded gears.

Figure 2:
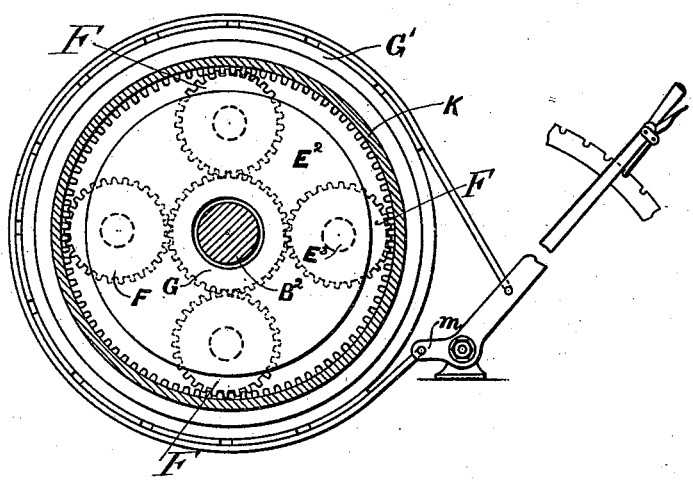
Figure 3:
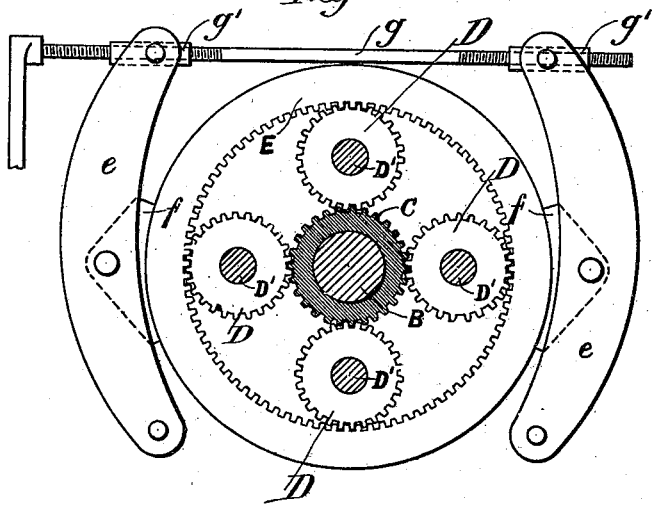

In the accompanying drawings, which illustrate the method of carrying my invention into effect, Figure 1 is a sectional elevation of the complete gear mechanism, and Figs. 2 and 3 are sections on the lines $a\,b$ and $c\,d$, respectively.

Referring to the figures, the motor-shaft A is hollow and is sleeved upon the power-transmission shaft B, from which the motion of the vehicle-axle is derived either directly or through suitable gearing. The extremity of the motor-shaft A has a pinion C formed or fixed upon it, which pinion forms the central element of the first epicyclic gear-train. The intermediate element of the train consists of pinions D, which are mounted on studs D', attached to a flange or projecting spider-arms B', formed upon the shaft B. The outer element of the train is constituted a brake-drum E, which is loosely sleeved at E' upon an extension $B^2$ of the transmission-shaft. The sleeve E' has rigidly attached to it a face-plate $E^2$, which carries studs $E^3$, upon which are revolubly mounted the pinions F, constituting the intermediate element of a second epicyclic gear-train. The internal element of this gear-train consists of a hollow pinion G, mounted loosely upon the sleeve E' and fixed to a brake-wheel G'. The internally-toothed annulus H, formed upon the flanged disk K, the boss K' of which is securely fastened to the tapered extremity of the shaft extension $B^2$, forms the outer element of the second epicyclic gear-train.

The speed ratio of the first epicyclic train C D E is arranged to suit the exigencies of design and the requirements of the case for which the gear may be required, a suitable ratio for many purposes being about three to one, and the gearing is rendered operative to give this speed ratio by tightening the brake on the drum E, thereby causing the pinions D to travel around the inside of the drum and driving the shaft B at the reduced speed in the same direction as the motor-shaft A. When it is desired to vary the speed ratio, the brake on the wheel G' is rendered operative, and the annulus E then receives motion from the intermediate element F of the second gear-train. It will thus be seen that by compounding two sets of epicyclic gear-trains as above described the mechanism may be designed to give whatever speed ratio is required.

In order to provide a convenient means of reversing the driving of the motor-shaft A, a loose sleeve L is fitted, which has a flanged face-plate M rigidly attached to it. This face-plate carries upon studs M' pinions N, which gear with an external annulus P, supported on the outer ends of the studs D', and also with the pinion C. The flange of the face-plate M is fitted with a brake-strap, by means of which the said plate may be rendered stationary, so as to cause the motor-shaft A to drive the shaft B in the reversed direction.

The construction of brake-operating gear is illustrated in Fig. 3, which shows a brake consisting of two levers $e$ $e$, pivoted at one end and fitted with brake-blocks $f$ $f$. Pressure is applied to the blocks by means of the rod $g$, which is provided with right and left handed screw-threads working in the nuts $g'$.

Fig. 2 shows a brake of the ordinary band form, which is operated by tilting the pivoted lever $m$ by means of the hand-gear. It is obvious, however, that any suitable form of brake might be employed for arresting the motion of the brake-drums in operating the gearing.

$m'$ $m^2$ $m^3$ indicate the brake-straps, which pass around the brake-drums E, G', and M, respectively.

Having now described my invention, what I claim as new, and desire to secure by Letters Patent, is—

1. In a gear for the transmission of power, change-speed mechanism, comprising two compounded epicyclic gear-trains, the central element of the first train receiving motion from the power driving-shaft, the intermediate element being connected to the driven shaft, and the outer element constituting a brake-drum, said brake-drum being adapted to receive motion through the intermediate element of the second epicyclic train, and a suitable brake for said brake-drum, the outer element of the second epicycle-train being connected to the driven shaft and the internal element fitted with a brake-wheel and a suitable brake for said brake-wheel, substantially as set forth.

2. In a gear for the transmission of power, the combination of change-speed mechanism, consisting of two compounded epicyclic gear-trains C, D, E and G, F, H, with a reversing-gear comprising a brake-drum M, a suitable brake for said brake-drum, pinions N supported by the brake-drum M, said pinions meshing with the central pinion C of the first epicyclic train, and an annulus P supported on the axes of the intermediate element of the first gear-train, substantially as set forth.

In witness whereof I have hereunto set my hand in presence of two witnesses.

FREDERICK WILLIAM LANCHESTER.

Witnesses:
JOHN GIBSON,
W. H. STUBBS.